(12) United States Patent
Lewis

(10) Patent No.: US 10,506,791 B1
(45) Date of Patent: Dec. 17, 2019

(54) CAT LITTER BOX

(71) Applicant: Glenda Lewis, Wills Point, TX (US)

(72) Inventor: Glenda Lewis, Wills Point, TX (US)

( * ) Notice: Subject to any disclaimer, the term of this patent is extended or adjusted under 35 U.S.C. 154(b) by 280 days.

(21) Appl. No.: 15/264,685

(22) Filed: Sep. 14, 2016

Related U.S. Application Data

(60) Provisional application No. 62/219,734, filed on Sep. 17, 2015.

(51) Int. Cl.
*A01K 1/01* (2006.01)
*A01K 27/00* (2006.01)

(52) U.S. Cl.
CPC .......... *A01K 1/0107* (2013.01); *A01K 1/0114* (2013.01); *A01K 27/009* (2013.01)

(58) Field of Classification Search
CPC .... A01K 1/0107; A01K 1/0114; A01K 1/033; A01K 1/0146; A01K 1/011; A01K 1/0121; A01K 1/0125; A01K 1/013; A01K 1/03; A01K 27/009
See application file for complete search history.

(56) References Cited

U.S. PATENT DOCUMENTS

| | | | | |
|---|---|---|---|---|
| 4,021,975 A * | 5/1977 | Calkins | ................. | A01K 1/033 119/165 |
| 4,291,645 A * | 9/1981 | Cruchelow | ............ | A01K 1/033 119/484 |
| 5,148,767 A * | 9/1992 | Torchio | .................. | A01K 1/033 119/484 |
| 5,195,457 A * | 3/1993 | Namanny | ............ | A01K 1/0107 119/165 |
| 5,307,761 A * | 5/1994 | Berger, III | ........... | A01K 1/0107 119/165 |
| 5,337,697 A * | 8/1994 | Trimarchi | .............. | A01K 1/033 119/484 |
| 5,738,040 A * | 4/1998 | Simmons | ............. | A01K 1/0107 119/163 |
| 5,842,438 A * | 12/1998 | Messmer | ............. | A01K 1/0107 119/165 |
| 5,975,017 A * | 11/1999 | Cameron | ............... | A01K 1/033 119/165 |
| 6,176,201 B1 * | 1/2001 | Fields | .................. | A01K 1/0107 119/163 |
| 6,439,161 B1 * | 8/2002 | Clemmons | ............. | A01K 1/011 119/165 |
| 6,944,990 B2 * | 9/2005 | Noyes | ....................... | E06B 7/32 119/484 |
| 7,341,020 B2 * | 3/2008 | Ryan | .................... | A01K 1/0107 119/161 |

(Continued)

FOREIGN PATENT DOCUMENTS

FR 2937369 A1 * 4/2010 ............... E06B 7/32

*Primary Examiner* — Joshua D Huson

(74) *Attorney, Agent, or Firm* — Kenneth L. Tolar

(57) ABSTRACT

A litter box is mounted on a building outer wall having an opening formed thereon that is in communication with the building interior. The litter box includes a housing having a motorized drawer received therein and an open front that is aligned with the wall opening. When a sensor determines that a cat is nearby, a controller automatically extends the drawer into the building interior. When the sensor determines that the cat has left the area, the controller retracts the drawer into the housing and activates a waste comb to propel waste products into an underlying receptacle.

8 Claims, 3 Drawing Sheets

(56) References Cited

U.S. PATENT DOCUMENTS

| | | | | |
|---|---|---|---|---|
| 7,861,674 B2* | 1/2011 | Mercier | ............... | A01K 1/035 |
| | | | | 119/484 |
| 8,714,108 B1* | 5/2014 | Mickle | ............... | A01K 1/035 |
| | | | | 119/165 |
| 8,881,680 B1* | 11/2014 | Woody | ............... | A01K 1/0114 |
| | | | | 119/165 |
| 9,210,911 B2* | 12/2015 | Bernal | ............... | A01K 1/0107 |
| 9,961,875 B2* | 5/2018 | Goddard / Imel | ... | A01K 1/0107 |
| 2003/0168017 A1* | 9/2003 | Perelli | ............... | A01K 1/0107 |
| | | | | 119/165 |
| 2005/0161000 A1* | 7/2005 | Noyes | ............... | E06B 7/32 |
| | | | | 119/484 |
| 2009/0031964 A1* | 2/2009 | Proxmire | ............... | A01K 1/033 |
| | | | | 119/484 |
| 2010/0175631 A1* | 7/2010 | Bennatt | ............... | A01K 1/033 |
| | | | | 119/472 |
| 2010/0313818 A1* | 12/2010 | Cook | ............... | A01K 1/011 |
| | | | | 119/163 |
| 2013/0160381 A1* | 6/2013 | Sommer | ............... | A01K 1/0107 |
| | | | | 52/173.1 |
| 2013/0247834 A1* | 9/2013 | Kodat | ............... | A01K 15/02 |
| | | | | 119/484 |
| 2013/0263790 A1* | 10/2013 | Stange | ............... | A01K 1/0107 |
| | | | | 119/165 |
| 2015/0173323 A1* | 6/2015 | Plazarte | ............... | A01K 1/0114 |
| | | | | 119/163 |
| 2015/0216139 A1* | 8/2015 | Drake | ............... | A01K 1/034 |
| | | | | 119/480 |
| 2016/0302379 A1* | 10/2016 | Sprague | ............... | A01K 1/0107 |

* cited by examiner

CAT LITTER BOX

CROSS REFERENCE TO RELATED APPLICATIONS

This application is entitled to the benefit of provisional patent application No. 62/219,734 filed on Sep. 17, 2015, the specification of which is incorporated herein by reference.

BACKGROUND OF THE INVENTION

The present invention relates to an improved litter box that is automatically retracted into an outdoor enclosure after each use to minimize undesirable odors within a dwelling.

DESCRIPTION OF THE PRIOR ART

A cat owner typically maintains an indoor litter box to prevent a cat from accidently soiling carpets or flooring. However, to control odor, the owner must repeatedly clean the litter box, which is laborious and unsanitary. And, irrespective of cleaning frequency, eliminating all indoor odors is impossible.

Accordingly, there is currently a need for a cat litter box that controls indoor odors. The present invention addresses this need by providing a litter box that is automatically retracted into an outdoor enclosure until needed to prevent undesirable odors from entering a dwelling.

SUMMARY OF THE INVENTION

The present invention relates to a litter box that is mounted on a building outer wall having an opening formed thereon that is in communication with the building interior. The litter box includes a housing having an open front aligned with the wall opening and a motorized drawer received therein. When a sensor determines that a cat is near the wall, a controller automatically extends the drawer into the building interior. When the sensor determines that the cat has left the area, the controller retracts the drawer into the housing and activates a waste comb to propel waste products into an underlying receptacle.

It is therefore an object of the present invention to provide a litter box that prevents undesirable odors from being distributed to an indoor area.

It is therefore another object of the present invention to provide a litter box having an automated waste comb for removing waste products.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
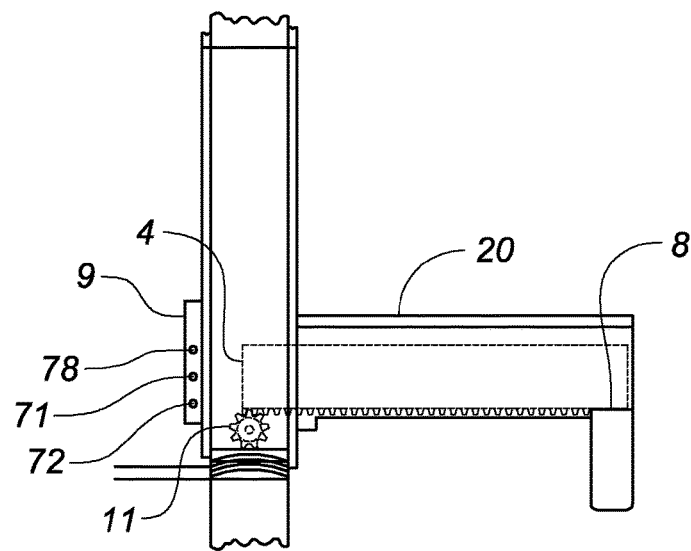
FIG. 1 is a side view of the litter box according to present invention with the box in the retracted position.
Figure 3:
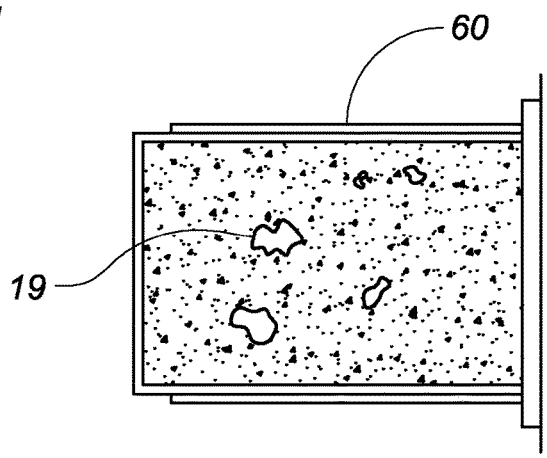
FIG. 3 is a top view of the extended box of FIG. 2.
Figure 2:
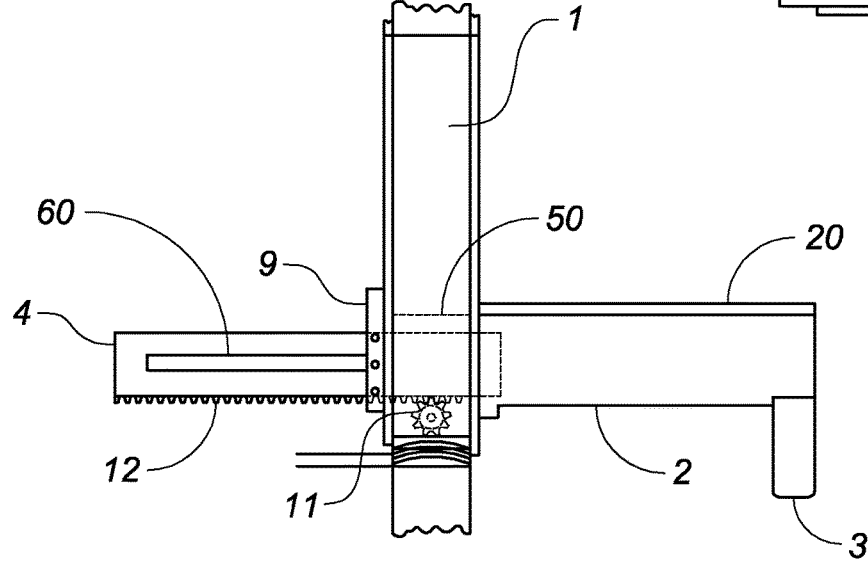
FIG. 2 is a side view of the litter box of FIG. 1 extended into a dwelling interior.
Figure 4:
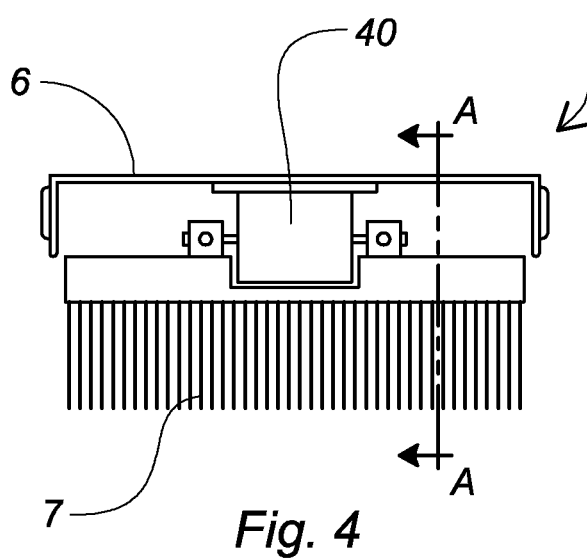
FIG. 4 is an isolated, front view of the waste comb.
Figure 5:
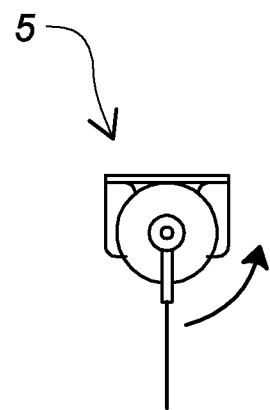
FIG. 5 is an isolated, cross-sectional view of the waste comb taken along A-A of FIG. 4.
Figure 7:
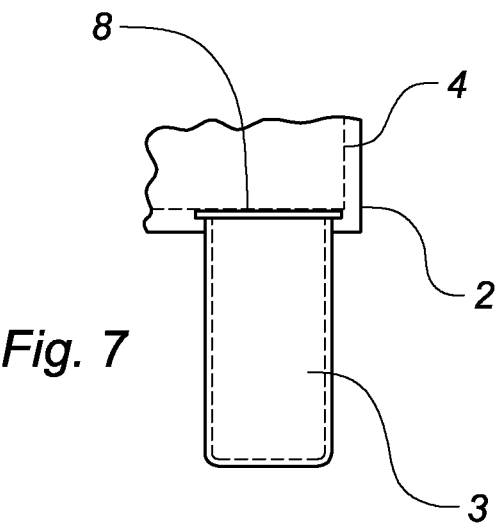
FIG. 7 is an isolated view of the waste receptacle.
Figure 8:
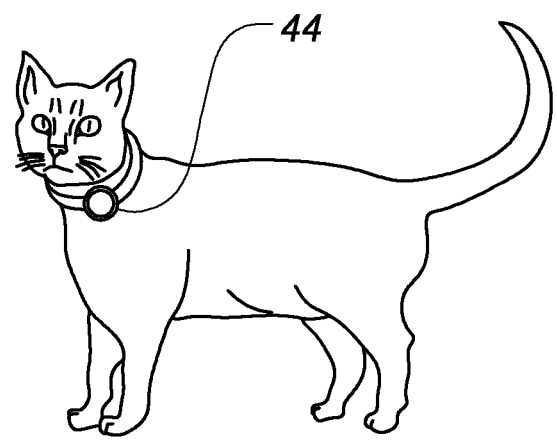
FIG. 8 depicts a cat wearing a collar and attached transmitter.
Figure 6:
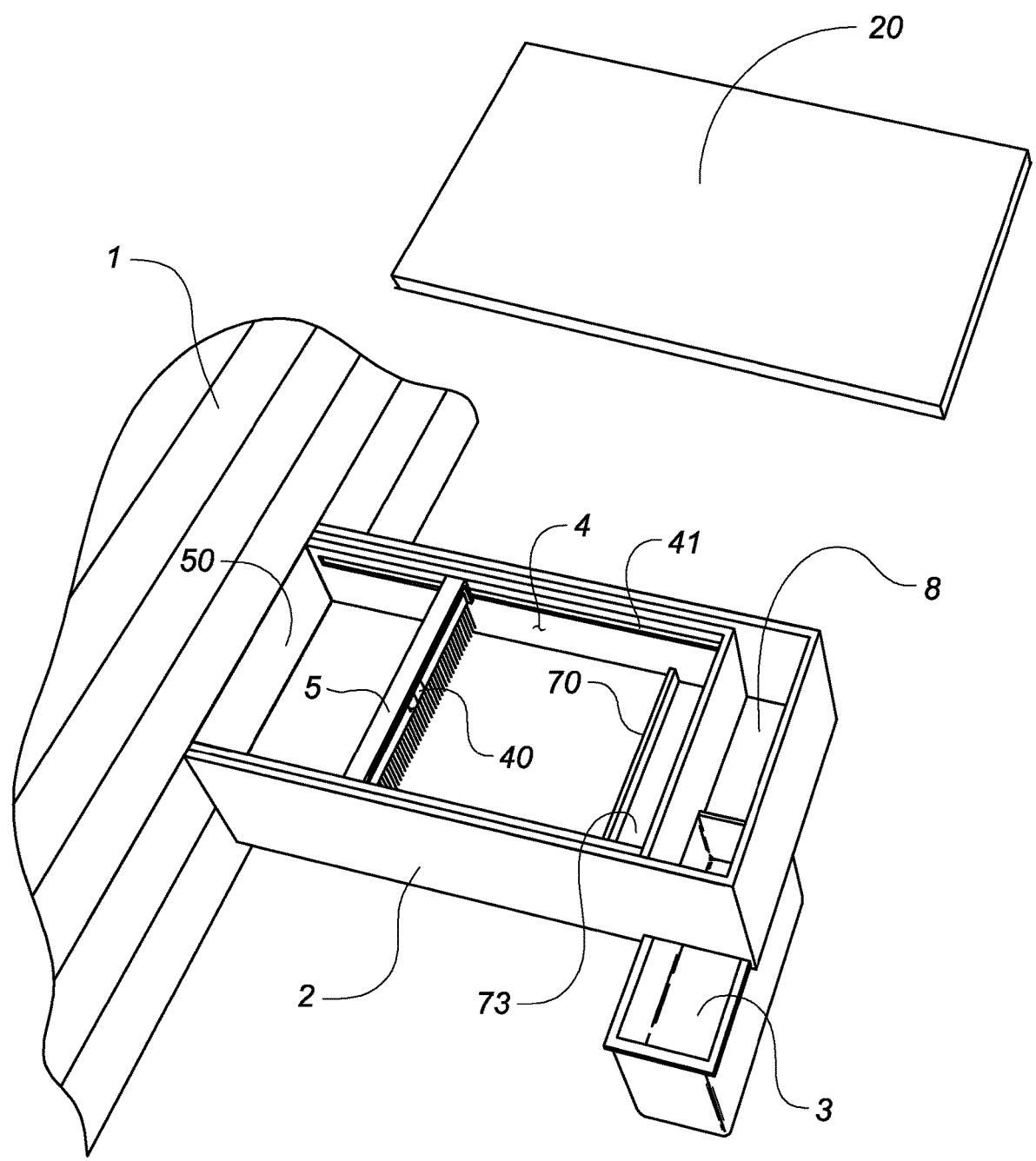
FIG. 6 is a perspective view of a building exterior with the litter box retracted outdoors.

The present invention relates to a litter box that is mounted on an outer wall 1 of a building having an opening 50 formed thereon that is in communication with the building interior. The litter box includes a housing 2 having a pair of sidewalls, a bottom wall, a rear wall and an open front end. The housing is attached to the exterior surface of the outer wall 1 with the open front end aligned with the opening 50. Removably attached to the bottom wall and positioned beneath a hole 8 is a receptacle 3 for collecting cat waste. The receptacle 3 may be lined with a small trash bag, a small paper sack or a similar disposable enclosure to prevent waste from soiling the receptacle. A lid 20 is removably attached to an open top to expose internal components described, infra.

Received within the housing is a litter drawer 4 having a bottom surface, two opposing sidewalls, an open top, a front wall, a rear wall, a low-profile barrier 70 spaced from the rear wall and an interior litter chamber. Each sidewall includes a roller-bearing glide mechanism 60 that allows the drawer to smoothly extend from and retract within the housing when loaded with cat litter. Within the litter chamber is a waste comb 5 including a casing 6 with a plurality of rigid, spaced tines 7 depending therefrom. The casing is attached to a first motor 40 that rotates a gear along a linear track 41 to move the comb toward either the front or rear of the drawer. The first motor 40 also rotates the casing within at least a ninety-degree range to pivot the tines between either of a horizontal, raised position and a vertical, deployed position.

On the exterior bottom surface of the drawer, near one or both sidewalls, is a linear gear 12 that engages a rotary gear 11 driven by a second motor 83 mounted within the wall opening 50 to automatically move the drawer into and out of the housing. On the bottom surface adjacent the rear wall is an aperture 73 that aligns with the hole 8 and waste receptacle 3 when the drawer is fully retracted within the housing. The low-profile barrier 70 retains litter within the litter chamber while allowing the comb to rake waste over a top edge an into the receptacle 3 as described in more detail below.

Surrounding the wall opening 50, on the indoor side, is a panel 9 having replaceable or rechargeable batteries therein for powering the motors. The panel also includes an infrared motion sensor 78, a radio-frequency receiver 71 and a microcontroller 72 for selectively operating the drawer and waste comb motors. A radio-frequency transmitter 44 in discrete communication with the RF receiver 71 is adapted to attach to a desired cat collar. The transmitter includes a warning LED that is illuminated to alert an owner that an internal battery requires recharging or replacing.

Accordingly, whenever the infrared motion sensor determines that there is movement nearby and the microcontroller simultaneously receives a signal from the transmitter worn by the cat, the drawer is automatically propelled into the dwelling. When the receiver or the infrared motion sensor determines that the cat has left the surrounding area, the microcontroller commands the second motor to retract the drawer within the housing. The first motor raises the comb tines to a horizontal position and propels the casing toward the front end of the drawer. The tines are lowered and the comb is driven toward the rear of the drawer to propel waste products and clumped litter 19 over the low-profile barrier and into the underlying waste receptacle 3.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with an outer wall of a building, said outer wall having an opening formed thereon that is in communication with a building interior, a cat litter box comprising:

a housing attached to said outer wall, said housing having an open front end that is aligned with the opening;

a litter drawer received within said housing;

means for automatically extending said litter drawer through said opening and into the building interior when a cat approaches said outer wall, and for retracting said litter drawer within said housing when the cat is a beyond a predetermined distance from the outer wall, wherein said means comprises:

a linear gear on said litter drawer;

a motorized gear within said opening and engaging said linear gear;

a wireless transmitter attached to the cat;

a wireless receiver in discrete communication with said transmitter;

a motion sensor near said opening;

a controller in communication with said motion sensor and said transmitter whereby when said motion sensor detects movement and said receiver receives a signal from said transmitter, said controller activates said motorized gear in a first direction to extend said drawer into the building interior.

2. The cat litter box according to claim 1 further comprising:

a waste receptacle removably attached to said housing;

an aperture on a bottom surface of said litter drawer that aligns with the waste receptacle when the drawer is fully retracted within the housing.

3. The cat litter box according to claim 2 further comprising:

a waste comb within said litter drawer;

means for moving said waste comb toward the aperture to rake waste into said waste receptacle.

4. The cat litter box according to claim 3 wherein said waste comb comprises a casing with a plurality of rigid, spaced tines depending therefrom.

5. The cat litter box according to claim 4 further comprising a means for rotating said tines to a horizontal position when said waste comb is moving away from said aperture and for rotating said tines to a vertical position when said waste comb is moving toward said aperture.

6. The cat litter box according to claim 3 further comprising a low-profile barrier spaced adjacent to said aperture that retains cat litter within said drawer while allowing said waste comb to rake waste products over a top edge of said barrier and into said waste receptacle.

7. The cat litter box according to claim 3 further comprising means for moving said waste comb away from said aperture when said drawer is retracted within said housing and for subsequently moving said waste comb toward said aperture to rake waste into said waste receptacle.

8. The cat litter box according to claim 1 further comprising a lid removably attached to an open top of said housing.

\* \* \* \* \*